(12) United States Patent
Faccin et al.

(10) Patent No.: US 8,498,268 B1
(45) Date of Patent: Jul. 30, 2013

(54) METHOD AND APPARATUS FOR RE-ESTABLISHING NETWORK CONNECTIVITY UPON HANDOVER IN A WIRELESS NETWORK

(75) Inventors: Stefano Faccin, Hayward, CA (US); Fan Zhao, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 527 days.

(21) Appl. No.: 12/511,881

(22) Filed: Jul. 29, 2009

Related U.S. Application Data

(60) Provisional application No. 61/084,494, filed on Jul. 29, 2008.

(51) Int. Cl.
*H04W 4/00* (2009.01)

(52) U.S. Cl.
USPC ........ 370/331; 370/395.2; 370/401; 455/437; 455/439

(58) Field of Classification Search
USPC .................. 370/328–334, 338; 455/436, 437, 455/438, 439, 442
See application file for complete search history.

(56) References Cited

U.S. PATENT DOCUMENTS

| 7,969,945 | B2 * | 6/2011 | Navali et al. | 370/331 |
| 2007/0002833 | A1 * | 1/2007 | Bajic | 370/352 |
| 2007/0025305 | A1 * | 2/2007 | Denny et al. | 370/338 |
| 2007/0217427 | A1 * | 9/2007 | Chung | 370/395.2 |
| 2009/0022126 | A1 * | 1/2009 | Damle et al. | 370/338 |
| 2010/0002634 | A1 * | 1/2010 | Tazaki | 370/328 |
| 2010/0172293 | A1 * | 7/2010 | Toth et al. | 370/328 |

* cited by examiner

*Primary Examiner* — Christopher Grey

(57) ABSTRACT

A method and apparatus for performing a handover of network connections upon a mobile terminal moving from a first access network to a second access network. The method includes obtaining IP connectivity and a first IP address for the mobile terminal through the first access network. In response to the mobile terminal moving from the first access network to the second access network, the method further includes sending a request for a new IP connectivity and a second IP address over the second access network, the request indicating a need to handover the network connections from the first access network to the second access network.

14 Claims, 3 Drawing Sheets

METHOD AND APPARATUS FOR RE-ESTABLISHING NETWORK CONNECTIVITY UPON HANDOVER IN A WIRELESS NETWORK

CROSS-REFERENCE TO RELATED APPLICATIONS

This disclosure claims the benefit of U.S. Provisional Application No. 61/084,494, filed Jul. 29, 2008, which is incorporated herein by reference.

FIELD

The present disclosure generally relates to wireless networks.

BACKGROUND

Dynamic Host Configuration Protocol (DHCP) is a network application protocol used by devices (DHCP clients) to obtain configuration information for operation in an Internet Protocol network. When a DHCP client (a computer or any other network-aware device) connects to a network, the DHCP client sends a broadcast query requesting necessary information from a DHCP server. The DHCP server manages a pool of IP addresses and information about client configuration parameters such as default gateway, domain name, the DNS servers, other servers such as time servers, and so forth. On receiving a valid request, the DHCP server assigns the DHCP client an IP address, a lease (length of time the allocation is valid), and other IP configuration parameters, such as a subnet mask and a default gateway. The broadcast query is typically initiated immediately after booting, and must complete before the DHCP client can initiate IP-based communication with other hosts.

A DHCP client (or host) using DHCP for IP address configuration typically renews an IP address (e.g., sends a new DHCP request, possibly providing an existing IP address to request the renewal of the lease to the IP address) only when timers associated with the IP address expire. However, if the host performs a handover from one (source) access network to another (target) access network, a lease to a particular IP address may not have necessarily expired and, therefore, the host would not send a new DHCP request over the target access network. Therefore, during handover the host would have no way to indicate the need to perform a handover of the network connections to the target access network.

SUMMARY

In general, in one aspect, this specification describes a mechanism for a mobile host to indicate to the mobile network the need to perform handover of network connections upon moving from a first access to a second access. The mobile host obtains IP connectivity and an IP address in the first access using a stateful address configuration mechanism. The mobile network provides IP connectivity to the mobile host using a network based IP mobility protocol. The mobile host moves from the first access network to the second access network. The mobile host sends a new IP connectivity and an IP address request over the second access network using a stateful address configuration mechanism, indicating to the network the need to handover the network connections to the second access network using the network based IP mobility protocol. The mobile network hands over the network connections to the second access network.

The stateful address configuration mechanism can include DHCP, and the network based IP mobility protocol can include PMIP. The mobile host can obtain one or more IP addresses. The mobile host sending a new IP connectivity and an IP address request over the second access using said a stateful address configuration mechanism can include the mobile host sending the request upon handover even if the timers associated with the IP address(es) are not expired. The mobile host can send one or more requests, depending on the number of IP addresses the mobile host obtained on the old (first) access network. The mobile host sending a new IP connectivity and an IP address request over the second access network using a stateful address configuration mechanism can include the mobile host providing the IP address(es) obtained over the first access network. The mobile network handing over the network connections to the second access network can include returning to the mobile host the same IP address that the mobile host obtained over the first access network. The mobile network handing over the network connections to the second access network can include returning to the mobile host a different IP address than that the mobile host obtained over the first access network.

BRIEF DESCRIPTION OF THE DRAWINGS

Like reference symbols in the various drawings indicate like elements.

DETAILED DESCRIPTION

Figure 1:
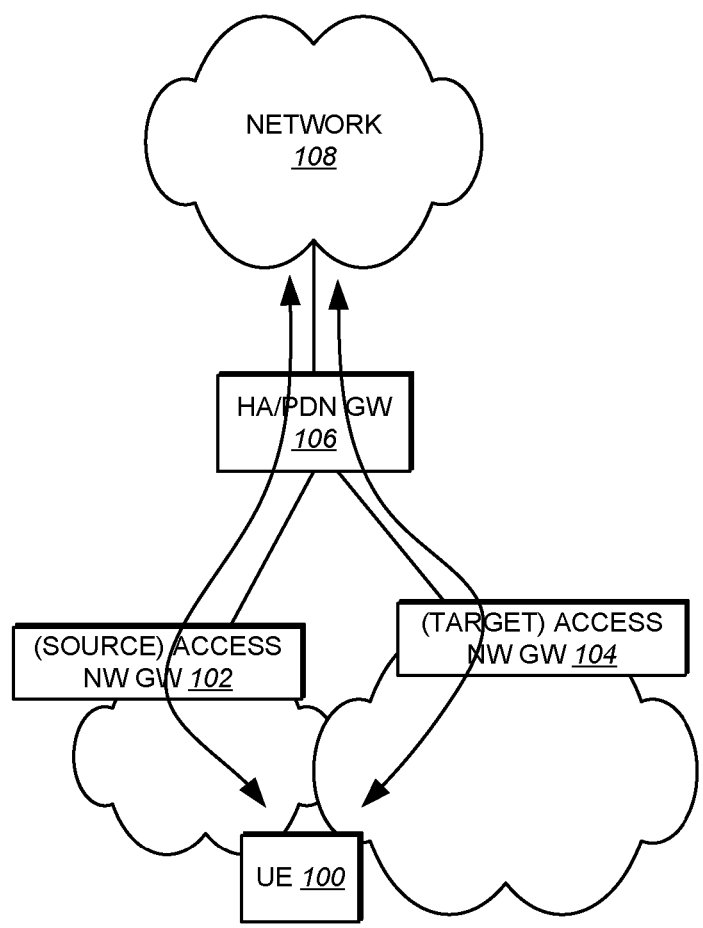
FIG. 1 illustrates a mobile terminal (or user equipment) capable of accessing different types of access networks.

The present disclosure focuses on wireless networks in which a mobile terminal is capable of accessing different types of access networks—e.g., 3GPP, WLAN, WiMAX, and so on. For example, FIG. 1 illustrates a UE 100 capable of respectively accessing two different types of access networks through access network gateways 102, 104. Each of the access network gateways 102, 104 are in communication with a packet data network (PDN) gateway 106. The PDN gateway 106 provides connectivity from the UE 100 to external packet data networks (e.g., network 108) by being the point of exit and entry of traffic for the UE 100. The UE 100 may have simultaneous connectivity with more than one PDN gateway for accessing multiple PDNs (not shown). The PDN gateway 106 performs policy enforcement, packet filtering for each user, charging support, lawful Interception and packet screening. In one implementation, PDN gateway 106 acts as the anchor for mobility between 3GPP and non-3GPP technologies such as WiMAX and 3GPP2 (CDMA 1X and EvDO).

The LTE specification for Release 8—3GPP SA2, TS 23.401, http://www.3gpp.org/ftp/Specs/archive/23 series/23.401/23401-810.zip; and 3GPP SA2, TS 23.402, http://www.3gpp.org/ftp/Specs/archive/23 series/23.402/23402-811.4 (both of which are incorporated herein by reference)—describes procedures for a mobile terminal (also referred to as a UE) to set up connectivity to multiple PDNs and to perform handover between different types of access networks (e.g., 3GPP access, trusted non-3GPP access and untrusted non-3GPP access) using various mobility protocols, including network-based mobility protocols (e.g., PMIP and GTP) and host-based mobility protocols.

In one implementation, when attaching to one access network, the UE 100 configures a network interface (associated with the UE 100) using either stateful IP address configuration mechanism (such as DHCP) or stateless IP address configuration mechanisms. In the case that the UE 100 uses DHCP to configure the network interface, the UE 100 can use a DHCPREQUEST message (DHCPv4) or a DHCP RENEW message (DHCPv6) to renew the lease of the IP address obtained before an IP address leased to the UE 100 is about to expire. Details of the DHCP REQUEST message and the DHCP REQUEST/RENEW message are respectively described in RFC 2131, "Dynamic Host Configuration Protocol", http://www.ietf.org/rfc/rfc2131.txt and RFC 3315, "Dynamic Host Configuration Protocol for IPv6 (DHCPv6)", http://www.ietforg/rfc/rfc3315.txt, both of which are incorporated herein by reference.

Figure 2:
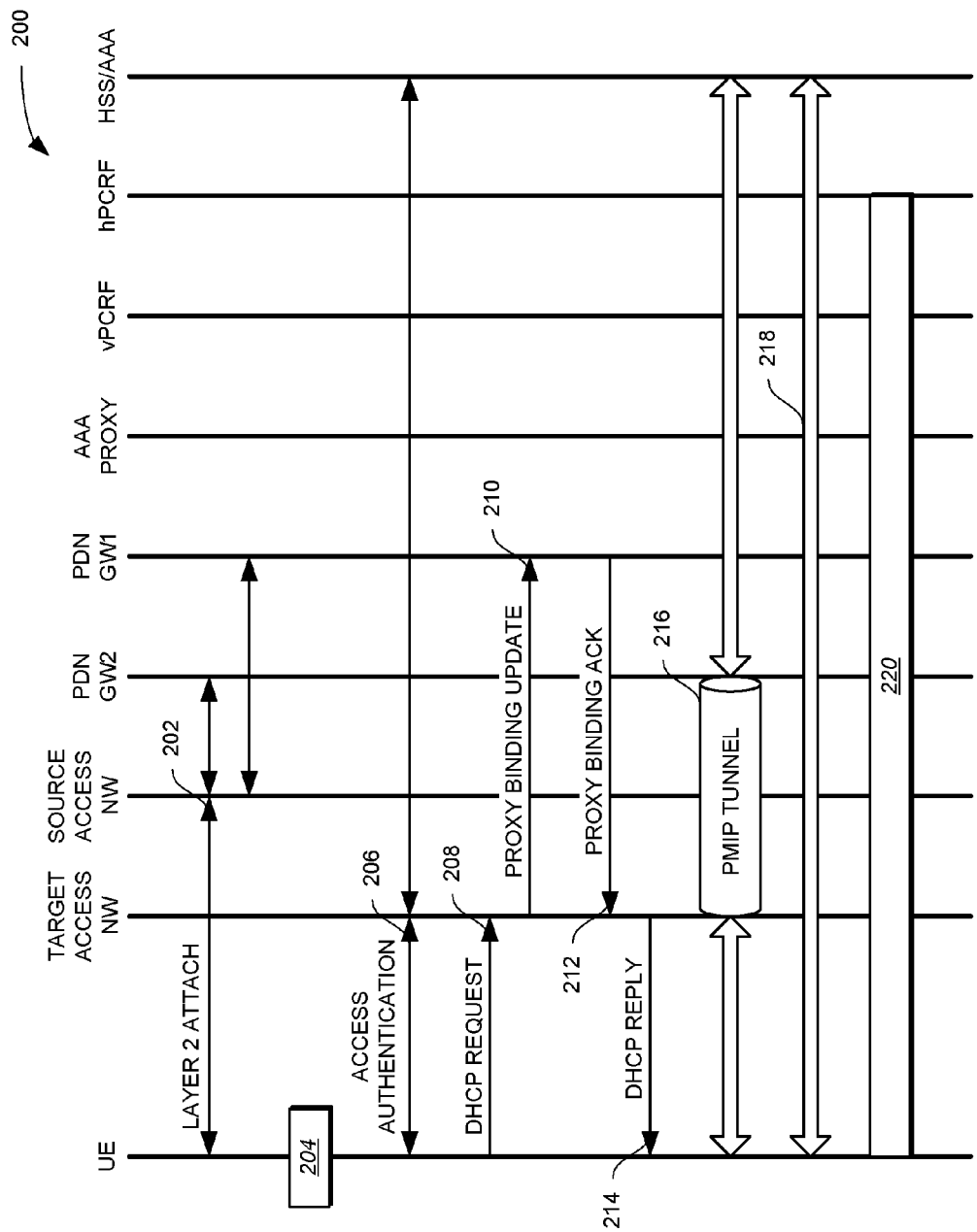
FIG. 2 illustrates an attach procedure for a user equipment.

FIG. 2 illustrates an attach procedure 200 for a UE (e.g., UE 100) in accordance with one implementation. The UE sets up connectivity to the PDN GW 1 and the PDN GW over the source access network (step 202). The UE discovers the target access network and decides to perform a handover to the target access network (step 204). The UE performs the access authentication over the target access network (step 206). In one implementation, during this step, a network based mobility protocol (e.g., PMIP) is selected to be used.

The UE starts to set up connectivity to the PDN GW 1 due to the handover by sending a DHCP REQUEST message (DHCPv4) or DHCP REQUEST/RENEW message (DHCPv6) over the target access network to request the same IP address obtained over the source access network from the PDN GW 1 (step 208). In one implementation, the DHCP REQUEST or DHCP REQUEST/RENEW message is sent even though such IP address configured on the interface and used over the source access network is not about to expire— e.g., timers associated with the IP address have not yet expired. The target access network sends a Proxy Binding Update message with the requested IP address to the PDN GW 1 (step 210). After the PDN GW 1 verifies the received Proxy Binding Update message, the PDN GW 1 returns a Proxy Binding Acknowledgement message with requested IP address to the target access network (step 212).

The target access network sends a DHCPACK message (DHCPv4) or a DHCP Reply message (DHCPv6) with the requested IP address to the UE as a response to the previously received DHCP message from the UE (step 214). The UE configures the IP address on an interface of the UE which is attached to the target access network, and network connectivity to the PDN GW 1 is established (step 216). The steps 208-216 are performed in order for the UE to establish the connectivity to the PDN GW 2 over the target access network (step 218). In one implementation, the same IP address obtained from the PDN GW 2 over the source access network, even though the IP address is not yet about to expire, is requested by the UE via DHCP. The UE may perform the procedure specific to the source access network and the mobility mechanism used to release sources previously allocated (step 220).

One or more of the procedure steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 3:
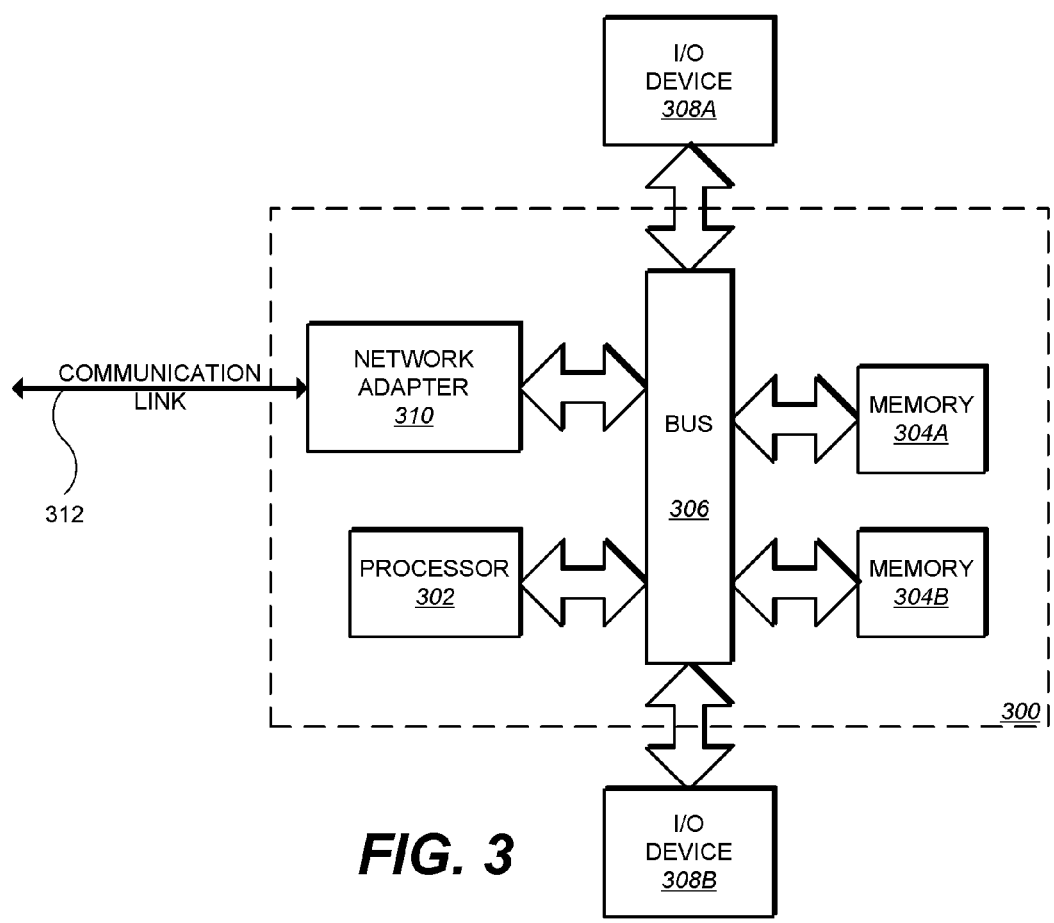
FIG. 3 is a block diagram of a data processing system suitable for storing and/or executing program code.

FIG. 3 illustrates a data processing system 300 (e.g., a UE) suitable for storing and/or executing program code. Data processing system 300 includes a processor 302 coupled to memory elements 304A-B through a system bus 306. In other implementations, data processing system 300 includes more than one processor and each processor can be coupled directly or indirectly to one or more memory elements through a system bus. Memory elements 304A-B can include local memory employed during actual execution of the program code, bulk storage, and cache memories that provide temporary storage of at least some program code in order to reduce the number of times the code must be retrieved from bulk storage during execution. As shown, input/output or I/O devices 308A-B (including, but not limited to, keyboards, displays, pointing devices, etc.) are coupled to data processing system 300. I/O devices 308A-B may be coupled to data processing system 300 directly or indirectly through intervening I/O controllers (not shown).

In one implementation, a network adapter 310 is coupled to data processing system 300 to enable data processing system 300 to become coupled to other data processing systems or remote printers or storage devices through communication link 312. Communication link 312 can be a private or public network. Modems, cable modems, and Ethernet cards are just a few of the currently available types of network adapters.

Although the subject matter has been described in language specific to structural features and/or methodological operations, the subject matter defined in the appended claims is not necessarily limited to the specific features or acts described above, including orders in which the acts are performed.

What is claimed is:

1. A method for performing a handover of network connections upon a mobile terminal moving from a first access network to a second access network, the method comprising:
    obtaining, through the first access network, Internet Protocol (IP) connectivity and a first IP address for the mobile terminal, wherein the first IP address is associated with a first packet data network gateway;
    obtaining, through the first access network, a second IP address for the mobile terminal, wherein the second IP address is associated with a second packet data network gateway, wherein the second data network gateway is different from the first data network gateway, and wherein the second IP address is different from the first IP address; and
    in response to the mobile terminal moving from the first access network to the second access network,
        i) sending a first request, by the mobile terminal over the second access network, for a first new IP connectivity and the first IP address, wherein the first request indicates a need to handover network connections associated with the first packet data network gateway from the first access network to the second access network, and wherein the first request includes the first IP address, and ii) sending a second request, by the mobile terminal over the second access network, for a second new IP connectivity and the second IP address, wherein the second request indicates a need to handover network connections associated with the second packet data network gateway from the first access network to the second access network, and wherein the second request includes the second IP address.

2. The method of claim 1, wherein the first request comprises a DHCP REQUEST message in compliance with DHCPv4.

3. The method of claim 1, wherein the first request comprises a DHCP REQUEST/RENEW message in compliance with DHCPv6.

4. The method of claim 1, wherein the first request is sent prior to a timer associated with the first IP address expiring.

5. The method of claim 1, wherein the first request is sent using a stateful address configuration mechanism.

6. The method of claim 1, wherein the IP connectivity through the first access network is provided to the mobile terminal using a network based IP mobility protocol.

7. The method of claim 6, wherein the network based IP mobility protocol comprises PMIP.

8. An apparatus comprising:
a processor; and
a computer-readable storage medium, wherein instructions are tangibly stored on the computer-readable storage medium, and wherein the instructions are executable by the processor to enable the processor to
obtain, through the first access network, Internet Protocol (IP) connectivity and a first IP address for the mobile terminal, wherein the first IP address is associated with a first packet data network gateway;
obtain, through the first access network, a second IP address for the mobile terminal, wherein the second IP address is associated with a second packet data network gateway, wherein the second data network gateway is different from the first data network gateway, and wherein the second IP address is different from the first IP address; and
in response to the mobile terminal moving from the first access network to the second access network,
i) send a first request, by the mobile terminal over the second access network, for a first new IP connectivity and the first IP address, wherein the first request indicates a need to handover network connections associated with the first packet data network gateway from the first access network to the second access network, and wherein the first request includes the first IP address, and
ii) send a second request, by the mobile terminal over the second access network, for a second new IP connectivity and the second IP address, wherein the second request indicates a need to handover network connections associated with the second packet data network gateway from the first access network to the second access network, and wherein the second request includes the second IP address.

9. The apparatus of claim 8, wherein the first request comprises a DHCP REQUEST message in compliance with DHCPv4.

10. The apparatus of claim 8, wherein the first request comprises a DHCP REQUEST/RENEW message in compliance with DHCPv6.

11. The apparatus of claim 8, wherein the first request is sent prior to a timer associated with the first IP address expiring.

12. The apparatus of claim 8, wherein the first request is sent using a stateful address configuration mechanism.

13. The apparatus of claim 8, wherein the IP connectivity through the first access network is provided to the mobile terminal using a network based IP mobility protocol.

14. The apparatus of claim 13, wherein the network based IP mobility protocol comprises PMIP.

* * * * *